US011015425B2

(12) United States Patent
Zhao et al.

(10) Patent No.: US 11,015,425 B2
(45) Date of Patent: May 25, 2021

(54) MITIGATING VIBRATIONS IN A DRILLING SYSTEM

(71) Applicant: Halliburton Energy Services, Inc., Houston, TX (US)

(72) Inventors: Yiming Zhao, Katy, TX (US); Jason Daniel Dykstra, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 264 days.

(21) Appl. No.: 15/529,968

(22) PCT Filed: Jul. 29, 2016

(86) PCT No.: PCT/US2016/044706
§ 371 (c)(1),
(2) Date: May 25, 2017

(87) PCT Pub. No.: WO2018/022089
PCT Pub. Date: Feb. 1, 2018

(65) Prior Publication Data
US 2019/0120040 A1    Apr. 25, 2019

(51) Int. Cl.
*E21B 44/04*     (2006.01)
*E21B 44/00*     (2006.01)
*E21B 3/02*      (2006.01)
*G05B 19/042*    (2006.01)

(52) U.S. Cl.
CPC .............. *E21B 44/04* (2013.01); *E21B 3/02* (2013.01); *E21B 44/00* (2013.01); *G05B 19/0426* (2013.01)

(58) Field of Classification Search
None
See application file for complete search history.

(56) References Cited

U.S. PATENT DOCUMENTS 6,166,654 A    12/2000  Van Den Steen
2011/0232966 A1  9/2011  Kyllingstad
(Continued)

FOREIGN PATENT DOCUMENTS

WO    2014147116 A1    9/2014
WO    2014147575 A1    9/2014

OTHER PUBLICATIONS

International Search Report and Written Opinion for PCT/US2016/044706 dated Apr. 20, 2017.
(Continued)

*Primary Examiner* — Brent A. Fairbanks
(74) *Attorney, Agent, or Firm* — Gilliam IP PLLC

(57) ABSTRACT

A method includes generating a torsional wave that propagates in a drill string having a drill bit coupled at a first end of the drill string and a top drive coupled at a second end of the drill string, and determining first and second components of the torsional wave. The first component propagates from the drill bit to the top drive and the second component propagates from the top drive to the drill bit. The method further includes calculating a first control signal to mitigate the first component, calculating a second control signal to regulate the second component, and generating a torque command based on the first and second control signals to control the top drive to dampen the torsional wave.

20 Claims, 13 Drawing Sheets

(56) References Cited

U.S. PATENT DOCUMENTS

| | | | |
|---|---|---|---|
| 2012/0130693 A1* | 5/2012 | Ertas | E21B 45/00 |
| | | | 703/2 |
| 2013/0248248 A1* | 9/2013 | Steidl | E21B 44/00 |
| | | | 175/24 |
| 2014/0034386 A1 | 2/2014 | Nessjoen et al. | |
| 2014/0360779 A1 | 12/2014 | Kyllingstad | |
| 2015/0240615 A1 | 8/2015 | Dykstra et al. | |
| 2016/0076354 A1 | 3/2016 | Lai et al. | |
| 2016/0138382 A1 | 5/2016 | Badkoubeh et al. | |
| 2016/0194946 A1 | 7/2016 | Dykstra et al. | |
| 2016/0281488 A1* | 9/2016 | Dwars | G01P 3/44 |
| 2017/0089189 A1* | 3/2017 | Norris | E21B 17/073 |

OTHER PUBLICATIONS

European Application Serial No. 16910750.5; European Search Report; dated Feb. 20, 2020, 7 pages.
CA Application Serial No. 3,024,786, Office Action, dated Oct. 16, 2019, 4 pages.

\* cited by examiner

MITIGATING VIBRATIONS IN A DRILLING SYSTEM

BACKGROUND

Drilling an oil and/or gas well can involve the creation of a borehole of considerable length, sometimes up to several kilometers vertically and/or horizontally. A drill string is commonly used to drill a borehole and comprises lengths of drill pipe that are coupled together. A drill bit and associated bottom hole assembly (BHA) are typically disposed at the lower end of the drill string, and the drill bit is rotated to drill and extend the borehole. In some cases, rotation of the drill bit can originate from a downhole drill motor (e.g., a mud motor). In other cases, however, the drill bit can be rotated by rotating the entire drill string using a drive system, such as a top drive, located at the Earth's surface.

The drill string is a slender structure relative to the length of the borehole, and, during a drilling operation, the drill string can be twisted several turns because of the resulting torque assumed at the drill bit (i.e., "torque-on-bit"). During drilling operations, the drill string can also exhibit a complicated dynamic behavior resulting in one or more of axial, lateral and torsional vibrations. It has been observed that the drill string often behaves as a torsional pendulum, wherein the top of the drill string rotates with a constant angular velocity, whereas the drill bit rotates with varying angular velocity comprising a constant part and a superimposed torsional vibration.

In some cases, due to torsional vibration and friction between the drill bit and the formation, the drill bit can periodically stop rotating while the top drive continues to rotate the drill string and, thereby, build up torque in the drill string. At one point, the torque overcomes the friction and the drill bit suddenly rotates again at an angular velocity that is substantially higher than the angular velocity with which the top drive is rotating the drill string at the surface. This phenomenon is known as "stick-slip." Stick-slip can be detrimental to drilling operations and can cause excessive bit wear, premature tool failures, and poor drilling rate. The high angular velocity leads to higher axial and lateral accelerations and forces.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to methods of damping torsional vibrations in a drill string by controlling the torque output of a drill string drive system based on the rotation of the drill string as measured at a surface location. The presently described methods also regulate the speed of the drill string relative to a specified set point of a particular variable related to the motion of the drill string, or to a time-varying profile of the same variable, and minimizes the reflection of the torsional vibrations (or torsional waves) into the drill string from the connection between the drill string and the drive system. As an example, and for purposes of discussion herein, the exemplary methods are described below with respect to mitigating torsional vibrations; however, it will be understood that the exemplary method is equally applicable to mitigating axial vibrations in the drill string, without departing from the scope of the disclosure.

Figure 1A:
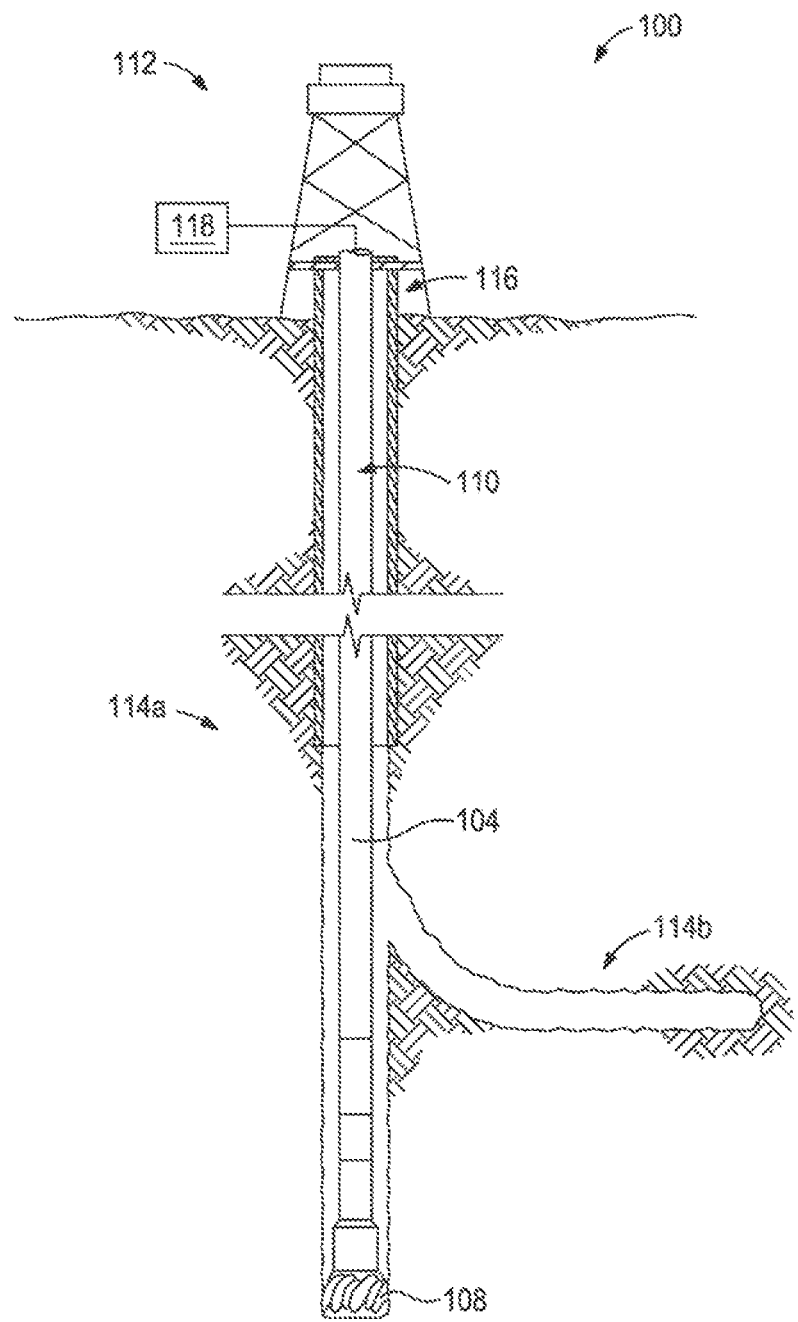
FIG. 1A illustrates an exemplary well system that may embody one or more principles of the present disclosure.

FIG. 1A illustrates an exemplary well system 100 that may embody or otherwise employ one or more principles of the present disclosure. The well system 100 may be located at a well surface or a well site 116. The well site 116 may include a drilling rig 112 that may have various characteristics and features associated with a land-based drilling rig. While not shown, various types of drilling equipment such as a rotary table, drilling fluid pumps and drilling fluid tanks may be included in the drilling rig 112 at the well site 116. Moreover, while the well system 100 is depicted as a land-based operation, it will be appreciated that the principles of the present disclosure could equally be applied in any sea-based or sub-sea application where the drilling rig 112 may be a floating platform or sub-surface wellhead installation, as generally known in the art.

The well system 100 also includes a drilling assembly 110 including a drill string 104 having a drill bit 108 coupled to a downhole end thereof. The drill bit 108 may be used to form a wide variety of wellbores or bore holes such as a generally vertical wellbore 114a or a generally horizontal wellbore 114b, or any combination thereof. The well system 100 may further include a control system 118 communicably coupled to the drilling assembly 110 and configured for mitigating torsional vibrations in the drill string 104 using the example methods described herein. The control system 118 may be typically located at the surface of the well (i.e., at or near the drilling rig 112) and may provide control commands to the drilling assembly 110, as described further below. Alternatively, the control system 118 may be located at a remote location from the drilling rig 112 and able to provide control commands to the drilling assembly 110 via wired or wireless telecommunication means.

Figure 1B:
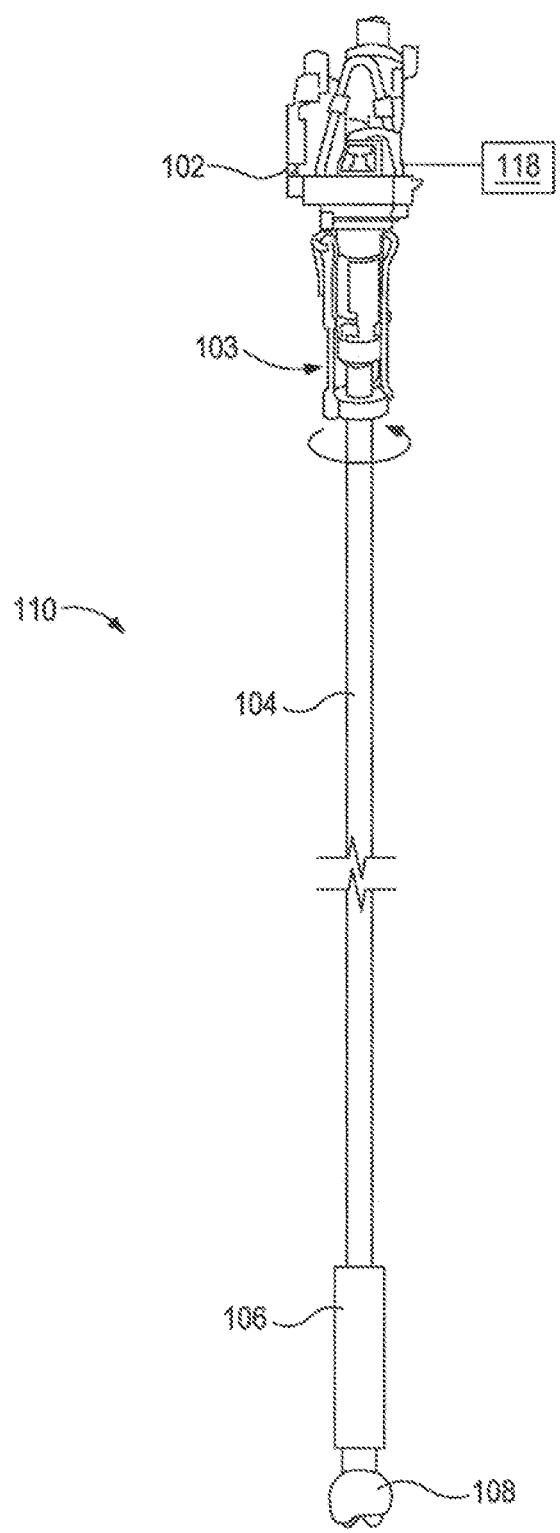
FIG. 1B illustrates the drilling assembly of the well system of FIG. 1A.

FIG. 1B illustrates an enlarged view of the drilling assembly 110 of FIG. 1A. The drilling assembly 110 may include the drill string 104, the drill bit 108, and a bottom hole assembly (BHA) 106 disposed adjacent the drill bit 108. As illustrated, the control system 118 may be communicably coupled to the drilling assembly 110 and, as mentioned above, may be operable to mitigate torsional vibrations in the drill string 104. The drill string 104 is rotatably coupled to a top drive 102 at a junction 103 defined as the connection between the top drive 102 and the drill string 104.

As mentioned above, stick-slip occurs during the interaction of the drill bit 108 and the formation rock being penetrated by the drill bit 108, which causes the drill string 104 to vibrate while rotating. With increased rotational speed of the drill bit 108, the resulting vibration causes excessive wear and tear of the drill bit 108, thereby reducing the drilling efficiency and increasing the drill bit 108 replacement costs. Stick-slip can also reduce the life of the BHA 106, the drill string 104, and the top drive 102, and induce other types of undesirable vibrations.

The torsional vibration dynamics of the drill string 104 contribute to the stick-slip phenomenon. The drill string 104 is a long and relatively slender object, which can be considered as a torsional spring capable of storing a significant amount of energy generated due to the stick-slip phenomenon. The top drive 102, the BHA 106, and the drill bit 108 are relatively shorter and more rigid compared to the drill string 104, and, therefore, the torsional vibration energy stored in the top drive 102, the BHA 106, and the drill bit 108 is negligible and can be ignored.

For purposes of discussion, the physical and mechanical characteristics of the drill string 104 can be considered similar to those of an elongate rod. The axial and torsional dynamics of an elongate rod can be described by a wave equation generally represented by:

$$c^2 \frac{\partial^2 u}{\partial x^2} = \frac{\partial^2 u}{\partial^2 t} \quad \text{Equation (1)}$$

wherein u is the displacement variable, x is position of the wave, t is time, c is the speed of the wave propagation.

For the elongate rod (or the drill string 104, in this case), the speed c of wave propagation along its length can be represented as $c=\sqrt{(G/\rho)}$, wherein G represents the shear modulus of the rod material and $\rho$ represents the density of the rod material. Based on Equation (1) above, the torque along the rod is given by:

$$T = GI_t \frac{\partial u}{\partial x} \quad \text{Equation (2)}$$

wherein u represents the displacement variable, which, in this case, is the rotational angle and $I_t$ represents the second moment of inertia of a cross-section of the rod.

At any given moment, the torsional wave in the rod, denoted by (x,t), can be decomposed into two wave components $u^{\rightarrow}(x,t)$ and $u^{\leftarrow}(x,t)$, such that $(x,t)=u^{\rightarrow}(x,t)+u^{\leftarrow}(x,t)$. Herein, $u^{\rightarrow}(x,)$ represents a torsional wave component traveling in the direction of increasing x (e.g., away from a point), and $u^{\leftarrow}(x,t)$ represents a torsional wave component traveling in the opposite direction (e.g., towards a point).

As mentioned above, the torsional wave components simultaneously travel along the drill string 104 in both directions, towards the top drive 102 and away from the top drive 102. The component of the drilling assembly 110 that is able to actively react to the torsional vibration is the top drive 102. According to one or more embodiments disclosed, an exemplary method includes using the top drive 102 to dampen (reduce) the torsional vibration of the drill string 104, and thereby mitigate adverse effects of the stick-slip phenomenon.

For the purposes of discussion herein, we define the positive direction for torsional wave propagation as travelling in the direction of the top drive 102 (corresponding to $u^{\rightarrow}(x,t)$), and the negative direction as traveling in the direction of the drill bit 108 (corresponding to $u^{\leftarrow}(x,t)$). At a location between the drill bit 108 and the top drive 102, the top drive 102 may not be able to react to the wave component $u^{\leftarrow}(x,t)$ and reduce it because the speed of propagation of any "compensatory" wave generated by the top drive 102 is equal to the speed c of wave propagation and $u^{\leftarrow}(x,t)$ is also propagating along the drill string 104 at the same speed c. Therefore, a lag may be observed between $u^{\leftarrow}(x,t)$ and the reaction (e.g., a compensatory wave) of the top drive 102. In other words, the "compensatory" wave (or any other reaction) produced by top drive 102 may not be able to catch up with $u^{\leftarrow}(x,t)$ to cancel it out.

The top drive 102 also cannot mitigate the wave component $u^{\rightarrow}(x,t)$ at a location between the drill bit 108 and the top drive 102. This is because, the top drive 102 is located at the uphole end of the drill string 104, and the reaction of the top drive 102 causes a torsional wave traveling in the negative direction (the direction of travel of the $u^{\leftarrow}(x,t)$ component), which also cannot cancel out a vibration traveling in the positive direction.

Figure 2:
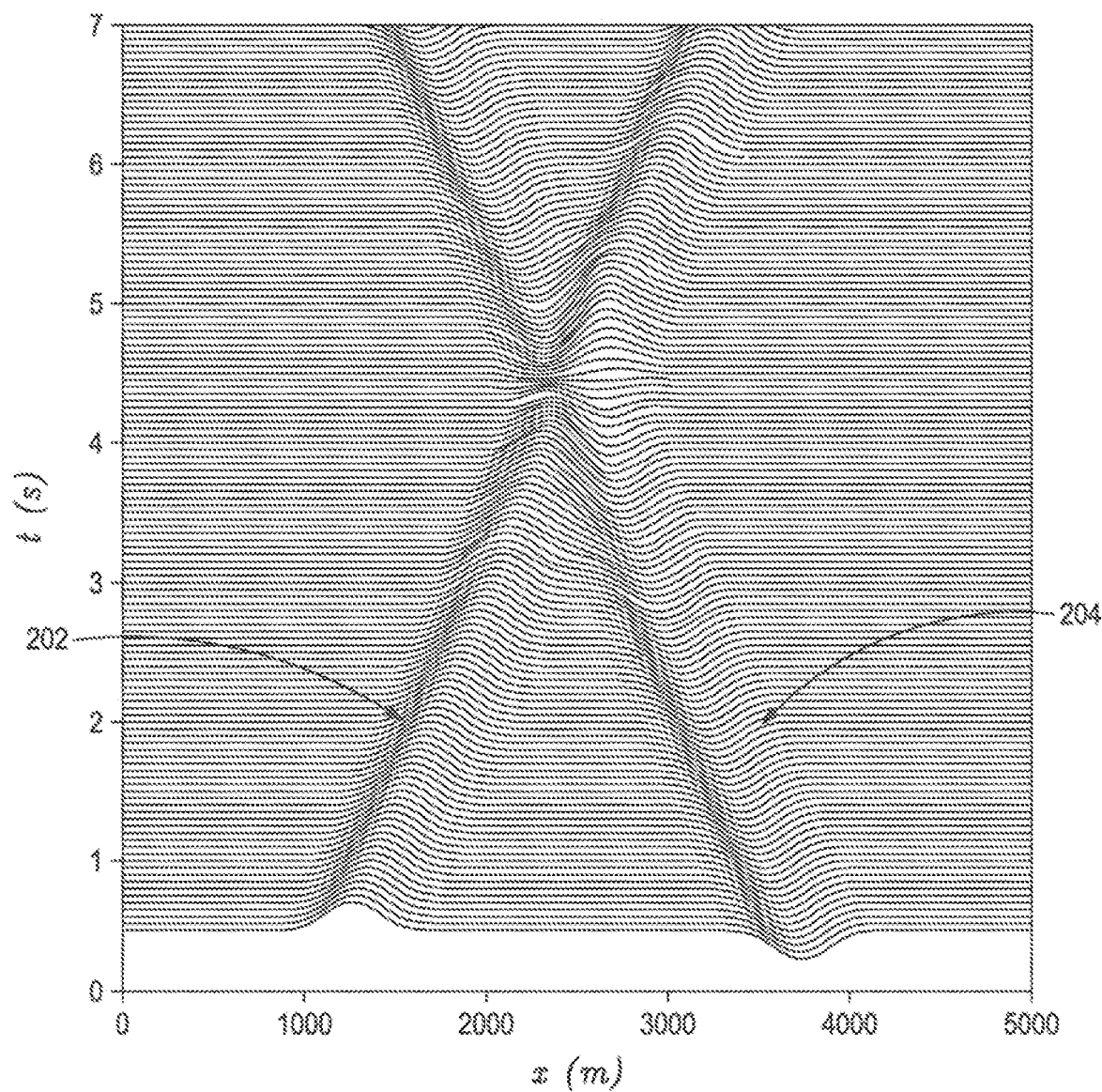
FIG. 2 is a graph illustrating the propagation of two torsional waves having equal but opposite magnitude from two opposite ends of a rod and in opposite directions

FIG. 2 is a graph illustrating the propagation of two torsional waves 202 and 204 with equal but opposite magnitude traveling from both ends of an elongate rod (e.g., the drill string 104) and in opposite directions. As illustrated, the displacement (x) of each torsional wave is plotted at different instances in time (t). The torsional wave 202 travelling in the positive direction may correspond to the torsional wave $u^{\rightarrow}(x,t)$ travelling from the drill bit 108 to the top drive 102, and the torsional wave 204 travelling in the negative direction may correspond to the torsional wave $u^{\leftarrow}(x,t)$ travelling from the top drive 102 to the drill bit 108. At first, the two torsional waves 202, 204 move towards each other. At about 4.3 seconds, however, the two torsional waves 202, 204 meet and the vibrations of the rod are substantially zero at that instance. However, the rotational speed of the rod at this instance is not zero, and the two torsional waves 202, 204 separate and resume travel. This illustrates that the top drive 102 cannot mitigate the torsional wave 202 ($u^{\rightarrow}(x,t)$) travelling from the drill bit 108 to the top drive 102. This is because any compensatory wave transmitted into the drill string 104 from the top drive 102 does not cancel out the torsional wave 202. The compensatory wave will meet the torsional wave 202 and each wave will then travel along the drill string 104 without affecting each other.

Referring again to FIG. 1B, the top drive 102 is able to react to the torsional vibration at the junction 103 between the top drive 102 and the drill string 104 and influence wave propagation at the junction 103. In particular, at the junction 103, part of the torsional wave from the drill string 104 is transmitted into the top drive 102, and part of it is reflected back as $u^\leftarrow(x,t)$ into the drill string 104. Because the top drive 102 is more rigid than the length of the drill string 104, the torsional speed transmitted to the top drive 102 can be considered to be the torsional speed of the top drive 102 itself. The torsional vibration of the drill string 104 can be reduced if no wave is reflected at the junction 103. Stated otherwise, the torsional vibration of the drill string 104 can be reduced when the wave component $u^\leftarrow(x,)=0$ at the junction 103.

For the purposes of discussion, it is assumed that L represents the location of the junction 103 (i.e., x=L) and that the torque on the drill string 104 and the rotational speed of the drill string 104 are continuous at the junction 103. The torsional wave propagating from the top drive 102 to the drill bit 108 may be represented as $f^\leftarrow(x+ct)$, while the torsional wave propagating from the drill bit 108 to the top drive 102 may be represented as $f^\leftarrow(x-ct)$. Both functions $\vec{f}$ and $\tilde{f}$ have the unit of rotational angle. The torque at the junction 103 at x=L is given by $$F_c = GI_t \vec{f'} + GI_t \tilde{f'} = GI_t(\vec{f'} + \tilde{f'})  \quad \text{Equation (3)}$$

wherein $\vec{f'}$ and $\tilde{f'}$ represent the derivatives of $\vec{f}$ and $\tilde{f}$, respectively, with respect to x.

The rotational speed of the drill string 104 at the junction 103 is given by $$v = c\vec{f'} + c\tilde{f'} \quad \text{Equation (4)}$$

wherein $-c\vec{f'}$ and $c\tilde{f'}$ are the derivatives of $\vec{f}$ and $\tilde{f}$, respectively, with respect to t.

Because the top drive 102 is short in length and relatively more rigid as compared to the drill string 104, it can be assumed that the top drive 102 also rotates at the rotational speed v of the drill string 104 as measured at the junction 103. Assuming $J_T$ represents the rotational inertia of the top drive 102, and $F_T$ represents the torque applied by a motor to the rotor of the top drive 102, then the motion of the top drive 102 may be given by $$J_T \dot{v} = F_T - F_c \quad \text{Equation (5)}$$

Eliminating $F_c$ from Equation (3) using Equation (5), we have $$GI_t(\vec{f'} + \tilde{f'}) = F_T - J_T \dot{v} \quad \text{Equation (6)}$$

By solving Equation (4) in conjunction with Equation (6), we have $$\tilde{f} = \frac{1}{2}\left[\frac{v}{c} + \frac{1}{GI_t}(F_T - J_T\dot{v})\right] \quad \text{Equation (7)}$$

In order to mitigate the stick-slip phenomenon, it is desirable for the top drive 102 to absorb all torsional vibrations from the drill string 104 and produce no torsional vibrations that propagate in the negative direction, i.e., from the top drive 102 into the drill bit 108. Stated otherwise, it is desired that $f^\leftarrow=0$, which results in $$F_T = -\frac{GI_t}{c}v + J_T\dot{v} \quad \text{Equation (8)}$$

Equation (8) represents the torque that a motor of the top drive 102 is required to produce (or assume) in order to rotate the top drive 102 in a way such that no torsional wave is reflected back into the drill string 104 from the junction 103 between the drill string 104 and the top drive 102.

When the rotational speed of the drill string 104 and the top drive 102 is regulated to a constant rotational speed set point $v_r$, using the same analysis as above, it may be shown that the torque required to be applied to the motor of the top drive 102 to prevent the reflection of torsional waves at the junction 103 may be given as $$F_T = -\frac{GI_t}{c}(v - v_r) + J_T\dot{v} \quad \text{Equation (9)}$$

A coefficient p*, which is a unique number depending on one or more physical properties of the drill string 104, and referred to as the non-reflective torque-speed ratio, may be defined as $$p^* = -\frac{GI_t}{c} = \frac{GI_t}{\sqrt{\frac{G}{\rho}}} = I_t\sqrt{G\rho} \quad \text{Equation (10)}$$

The exemplary method of damping torsional vibrations disclosed above is based on motion feedback. When the motion is rotational speed, the controller that implements the method may have the form $F_T = p(v-v_r) + J_T\dot{v}$, which is similar to a proportional-derivative (PD) controller. Here, p represents the controller proportional gain. When the motion is angular acceleration, the controller that implements the method may have the form similar to a proportional-integral (PI) controller, since speed is the integral of acceleration.

Figure 3C:
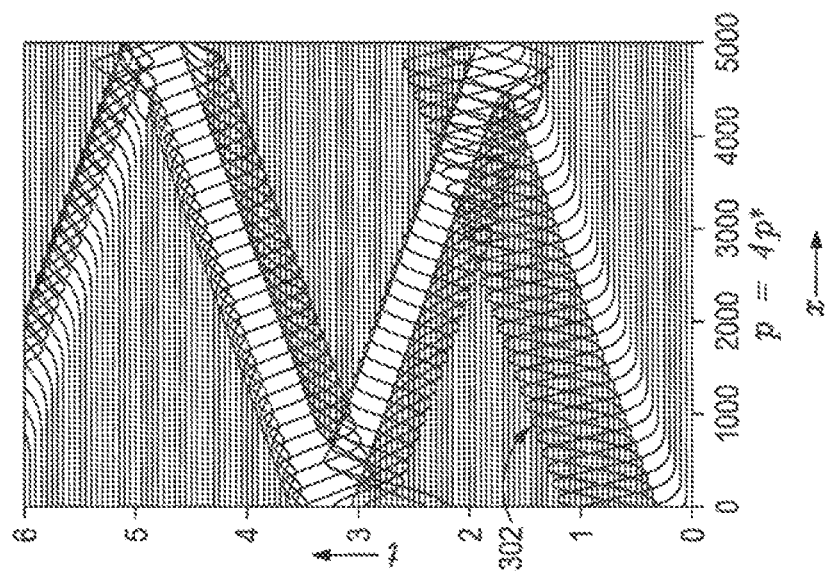
FIGS. 3A-3C illustrate how a controller proportional gain affects propagation of a torsional wave (or vibration) at the junction in FIG. 1B.
Figure 3B:
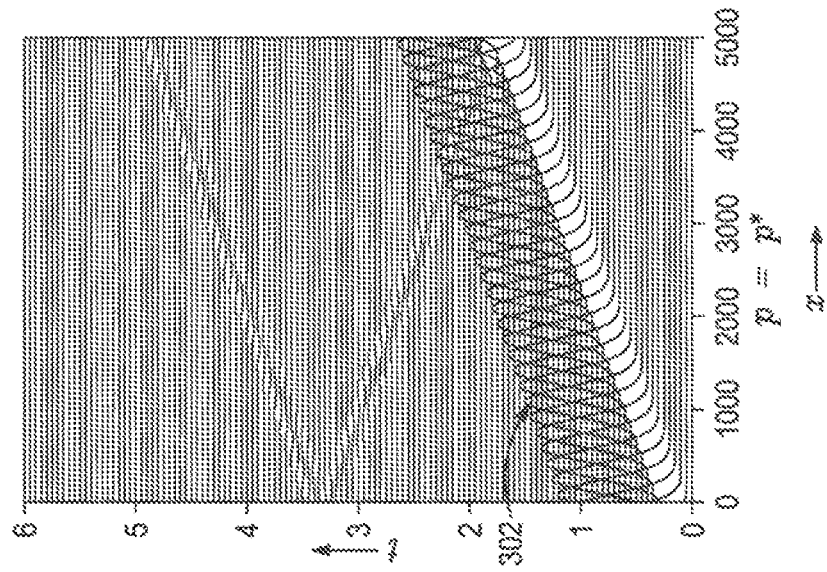
Figure 3A:
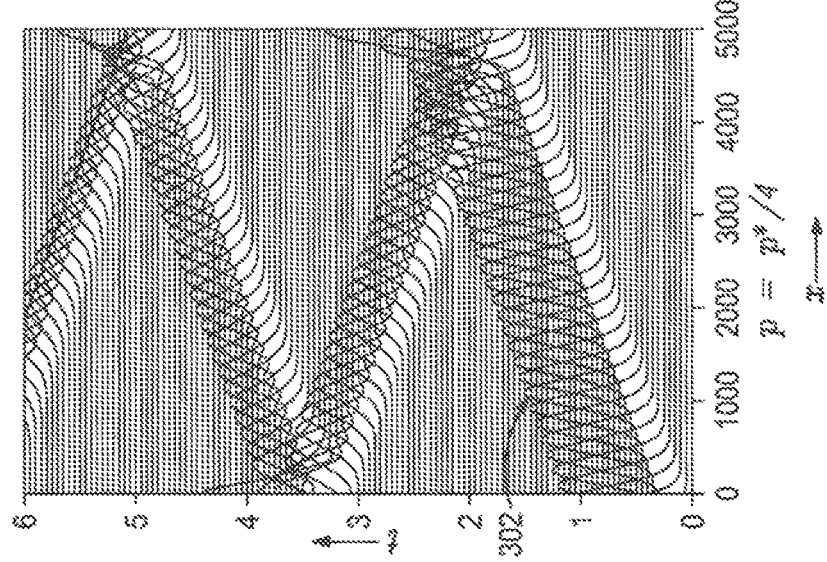

As an example, and to illustrate the effectiveness of the exemplary method, we consider a condition in which the rotational inertia of the top drive 102 is negligible, i.e., $J_T=0$, and torque is applied to the motor of the top drive 102 to prevent the reflection of torsional waves at the junction 103. FIGS. 3A-3C illustrate how the controller proportional gain p affects propagation of a torsional wave (or vibration) 302 at the junction 103 (FIG. 1B).

In FIGS. 3A-3C, with continued reference to FIG. 1B, the abscissa corresponds to a position (x) along the drill string 104 having a length of around 5000 meters long. The ordinate in FIGS. 3A-3C corresponds to time (t). The rotation angle along the drill string 104 is plotted at different times. Initially, at t=0, the drill string 104 is stationary. Then, as the drill string begins to rotate a torsional wave 302 is created at the downhole end (x=0) of the drill string 104 including the drill bit 108, which propagates to the uphole end (x=5000 m) of the drill string 104 including the top drive 102. The downhole end of the drill string 104 is unconstrained, as opposed to the uphole end, which is coupled to the top drive 102. At the uphole end, a torque with magnitude $F_T$=pv is applied, where p is negative.

In FIG. 3A, when p=p*/4, the torsional wave 302 is reflected at the uphole end of the drill string 104, and propagates along the drill string 104 back to the downhole end of the drill string 104. When the torsional wave 302 is reflected at the uphole end of the drill string 104, the rotational direction of the torsional wave 302 does not change after the reflection. In other words, the shape of the torsional wave 302 is still a "peak". This may be considered similar to a reflection at a free boundary. As illustrated, the torsional wave 302 "bounces" between the two ends of the drill string 104 for a certain amount of time (around 6 seconds) before dissipating.

In FIG. 3B, when p=p*, the torsional wave 302 is substantially absorbed due to the application of the torque at the uphole end of the drill string 104 at the time (around 2 seconds) when the torsional wave 302 reaches the uphole end of the drill string 104.

In FIG. 3C, when p=4p*, the torsional wave 302 is reflected at the uphole end of the drill string 104, and propagates back towards the downhole end of the drill string 104. It should be noted that when the torsional wave 302 is reflected from the uphole end of the drill string 104, a shape thereof changes from a "peak" to a "valley". This may be considered similar to a reflection at a fixed end. The torsional wave 302 "bounces" between the two ends of the drill string 104 for a substantial amount of time (around 6 seconds) before dissipating. From FIGS. 3A-3C it will thus be understood that torsional wave can be effectively minimized when the controller proportional gain equals the non-reflective torque-speed ratio, p=p*. If the controller proportional gain is not equal to the non-reflective torque-speed ratio, part of the torsional wave travelling to the top drive 102 will be reflected back into the drill string 104.

Referring again to FIG. 1B, when the rotational inertia $J_T$ of the top drive 102 is not negligible, the motion of the top drive 102 can produce a torsional wave that may propagate to the drill bit 108. In this case, the propagation of the torsional wave at the junction 103 may be decomposed into two components, and the top drive 102 may be configured to react to each of these two components separately and differently to mitigate torsional vibrations and to regulate the rotational speed of the drill string 104.

Assuming that $\vec{V}(x-ct)$ represents a torsional speed wave propagating in the direction of the top drive 102, and $\overleftarrow{V}(x+ct)$ represents a torsional speed wave propagating in the direction of the drill bit 108. The rotational angle waves associated with the torsional speed wave $\vec{V}(x-ct)$ and $\overleftarrow{V}(x+ct)$ may be represented by $\vec{u}(x-ct)$ and $\overleftarrow{u}(x+ct)$, respectively. The torque waves associated with the torsional speed waves $\vec{V}(x-ct)$ and $\overleftarrow{V}(x+ct)$ may be represented by $\vec{T}(x-ct)$ and $\overleftarrow{T}(x+ct)$, respectively. The relationship between the above parameters may be represented by:

$$\vec{V}(x-ct) = \frac{\partial}{\partial t}\vec{u}(x-ct) \quad \text{Equation (11)}$$
$$= -c\frac{\partial}{\partial x}\vec{u}(x-ct)$$
$$= -\frac{c}{GI_t}\vec{T}(x-ct)$$

Assuming that $\alpha = (GI\_t)/c$, we obtain $-\alpha\vec{V} = \vec{T}$. Similarly, we can obtain $\alpha\overleftarrow{V} = \overleftarrow{T}$. Since $V=\vec{V}+\overleftarrow{V}$, and $T=\vec{T}+\overleftarrow{T}$, we obtain $\vec{V} = 1/2(V-T/\alpha)$ and $\overleftarrow{V} = 1/2(V+T/\alpha)$.

The torsional speed wave $\overleftarrow{V}(x+ct)$ can be regulated by controlling the top drive 102, and simultaneously the top drive 102 is required to react to the torsional speed wave $\vec{V}(x-ct)$ travelling towards the top drive 102 to prevent the torsional speed wave $\vec{V}(x-ct)$ from reflecting back into the drill string 104. This may be achieved by generating a torque command that includes two components that respectively react to the torsional speed waves $\overleftarrow{V}$ and $\vec{V}$ to generate the torque command to control the top drive 102 and dampen the torsional wave in the drill string 104.

The component of the torque command that regulates the torsional speed wave $\overleftarrow{V}(x+ct)$ may be referred to as the speed regulation control component and may be generated by a speed regulation controller, and the component of the torque command that reacts to the torsional speed wave $\vec{V}(x-ct)$ may be referred to as the vibration mitigation control component and may be generated by a vibration mitigation controller. The operation of the speed regulation controller and the vibration mitigation controller may be coordinated using a set point controller that provides the desired set points for these two controllers. In any example, the set points may be determined based on the desired drilling speed. The speed regulation controller, the vibration mitigation controller, and the set point controller work jointly to regulate the rotational speed of the top drive 102 and the drill string 104 while mitigating the torsional vibrations in the drill string 104.

Figure 4:
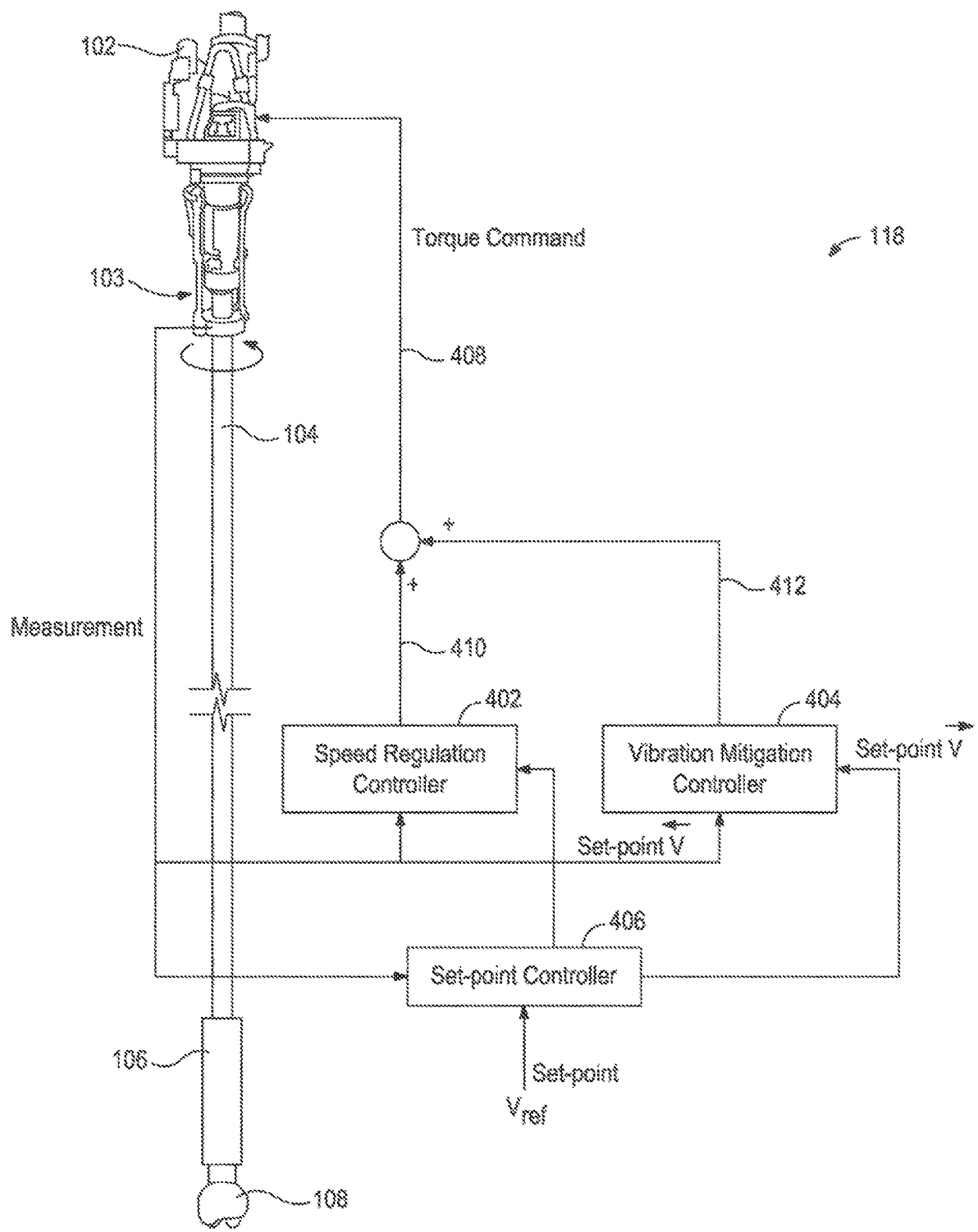
FIG. 4 illustrates a block diagram of a control system for mitigating torsional vibrations in the drill string of FIG. 1B.

FIG. 4 illustrates a schematic block diagram of the control system 118 of FIGS. 1A and 1B used to mitigate torsional vibrations in the drill string 104 using the method, according to one or more embodiments disclosed above. In an example, the control system 118 may be designed or configured based on the analysis set forth above. As illustrated, the control system 118 may include a speed regulation controller 402. The speed regulation controller 402 is configured to introduce a torsional speed wave $\overleftarrow{V}$ into the drill string 104 such that the drill string 104 rotates at a rotational speed set point $V_{LS}(t)$. The speed regulation controller 402 can be implemented using a variety of controllers including, but not limited to, a Proportional-Integral-Derivative (PID) controller, a robust controller, and a sliding mode controller.

A vibration mitigation controller 404 reacts to the torsional speed wave $\vec{V}(L,t)$ (L representing the instantaneous position of the wave along the drill string 104 and t representing the time) propagating towards the top drive 102, and rotates the top drive 102 in a way such that the junction 103 between the drill string 104 and the top drive 102 becomes non-reflective with respect to the torsional speed wave $\vec{V}(L,t)$. In other words, the vibration mitigation controller 404 may operate such that the torsional vibration energy in the torsional speed wave $\vec{V}(L,t)$ is absorbed at or adjacent the junction 103. Referring to the analysis set forth above, the vibration mitigation controller 404 may have or be configured based on the following form $$F_T = p^*(\vec{V}(L,t) - V_{RS}(t)) + J_T \frac{d}{dt}\vec{V}(L,t) \quad \text{Equation (12)}$$

Equivalently, the vibration mitigation controller 404 can also be configured as a speed controller that rotates the top drive 102 at a speed that follows the torsional speed wave $\vec{V}(L,t)$ propagating towards the top drive 102. $V_{RS}(t)$ in Equation (12) represents a set point for the torsional speed wave $\vec{V}(L,t)$.

If there is no external torque acting on the drill bit 108 other than the torque exerted by the top drive 102 and the drill string 104, after the torsional vibrations are damped out, T=0 and we have $$\vec{V} = \overleftarrow{V} = \frac{1}{2} V_{ref}$$

along the entire drill sting 104. Herein, $V_{ref}$ represents a desired rotational speed of the drill string 104 and the top drive 102 when the torsional vibration is mitigated. Therefore, in this case, it is desired to set the rotational speed set point $V_{LS}$ as $$V_{LS} = \frac{1}{2} V_{ref}$$

such that $\vec{V} + \overleftarrow{V} = V_{ref}$.

Similarly, suppose the drill bit 108 is subject to a constant torque $T_{bit}$ while interacting with the formation rock after substantially all torsional vibrations have been mitigated from the drill string 104. Then, to ensure a relatively constant desired rotational speed $V_{ref}$ along the drill string 104, the set points for the torsional speed waves $\vec{V}$ and $\overleftarrow{V}$ may be defined as $$\overleftarrow{V} = \left(V_{ref} + \frac{T_{bit}}{\alpha}\right)/2, \text{ and}$$
$$\vec{V} = \left(V_{ref} - \frac{T_{bit}}{\alpha}\right)/2$$

Equations (13)

A set point controller 406 estimates the torque $T_{bit}$ using rotational speed and torque as measured at the top drive 102 and updates the set points for the torsional speed waves $\vec{V}$ and $\overleftarrow{V}$ to ensure that the desired speed $V_{ref}$ is maintained. As illustrated, the measured rotational speed and torque are also provided to the speed regulation controller 402 and the vibration mitigation controller 404. In an example, the set point controller 406 may estimate the torque $T_{bit}$ by low-pass-filtering $2\alpha(\overleftarrow{V} - \vec{V})$. The speed regulation controller 402 outputs a speed control signal 410 and the vibration mitigation controller 404 outputs a vibration control signal 412. As illustrated, the speed control signal 410 and the vibration control signal 412 are combined (e.g., a summation operation) to generate a torque command 408 that controls the top drive 102.

Figure 5B:
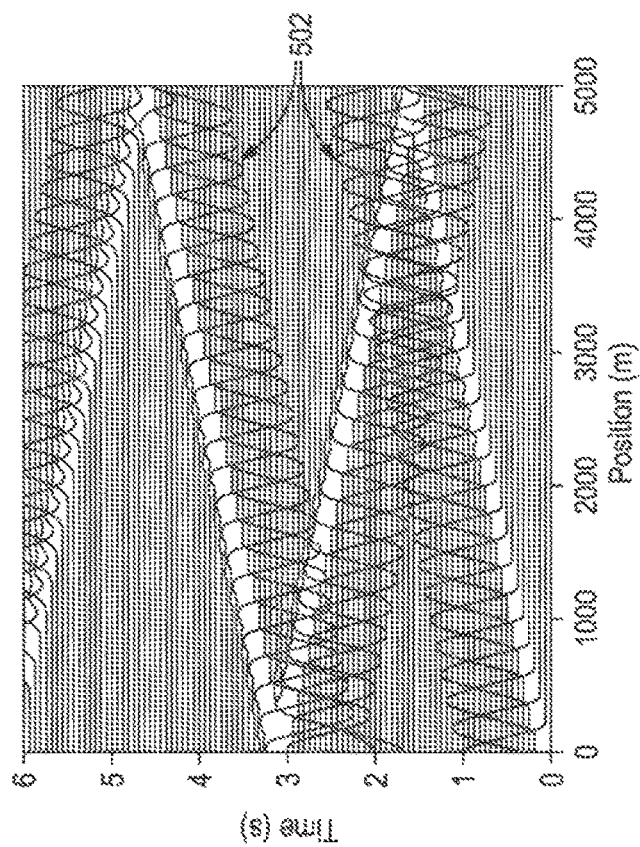
FIG. 5B is a plot that illustrates simulation results obtained when using a conventional control system to mitigate torsional vibrations in the drill string of FIG. 1B.
Figure 5A:
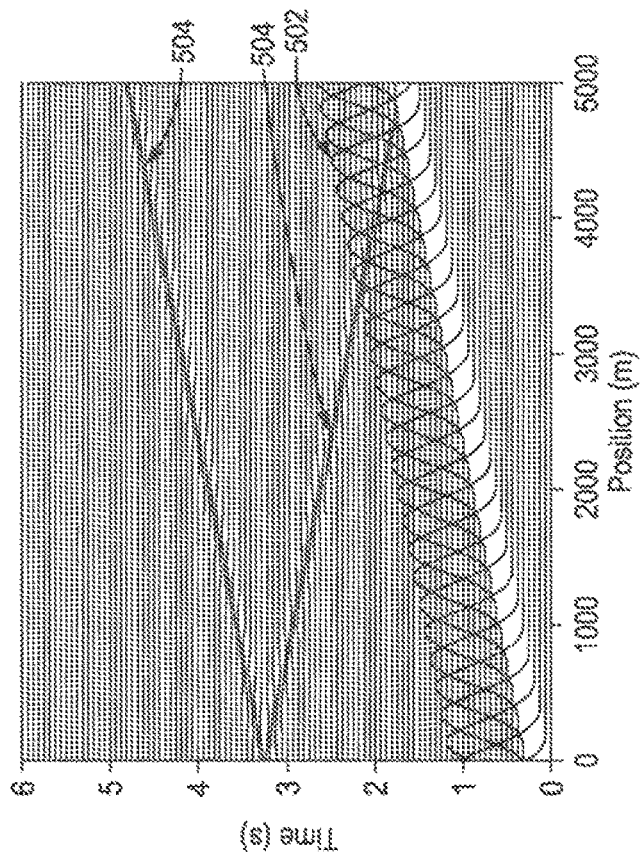
FIG. 5A is a plot that illustrates simulation results obtained when using the control system of FIG. 4 to mitigate torsional vibrations in the drill string of FIG. 1B.

FIG. 5A is a plot that illustrates simulation results obtained when using the control system 118 of FIG. 4 to mitigate torsional vibrations in a drill string. FIG. 5B is a plot that illustrates simulation results obtained when using a conventional control system to mitigate torsional vibrations in the same drill string. The simulation assumes that the top drive of the drilling system has a rotational inertia of around 950 kg-m2, and the drill string has an inner diameter of around 0.1214 m and an outer diameter of around 0.1397 m. The length of the drill string is assumed to be around 5000 m. For the sake of simplicity, effect of the drill bit and drill bit-rock interaction on the simulation results is excluded. As indicated in both FIGS. 5A and 5B, the drill string and the top drive rotate at a constant speed at the beginning of the simulation, where time=0. As the drill bit begins to rotate, a torsional wave 502 is then introduced at the downhole end (position=0) of the drill string and the torsional wave propagates towards the uphole end (position=5000 m) along the drill string where the top drive is located.

In the control system 118, the vibration mitigation controller 404 is configured to have the form represented by Equation (12) above, the speed regulation controller 402 is a standard PI controller, and the set point controller 406 is configured to estimate the torque $T_{bit}$ using a low pass filter. From the simulation results illustrated in FIG. 5A, it may be understood that the torsional wave 502 propagating to the top drive is absorbed relatively quickly at the top drive. The simulation results also illustrate a waveform 504 having a relatively negligible amplitude being reflected back into the drill string from the top drive. This may be due to a numerical error in the simulation and should not be considered as an artifact of the exemplary control method. As a comparison, referring to FIG. 5B, when a standard PI controller is used to regulate the speed of the top drive to a set-point, the torsional wave 502 is seen reflecting back-and-forth between uphole and downhole ends along the drill string multiple times.

Figure 6:
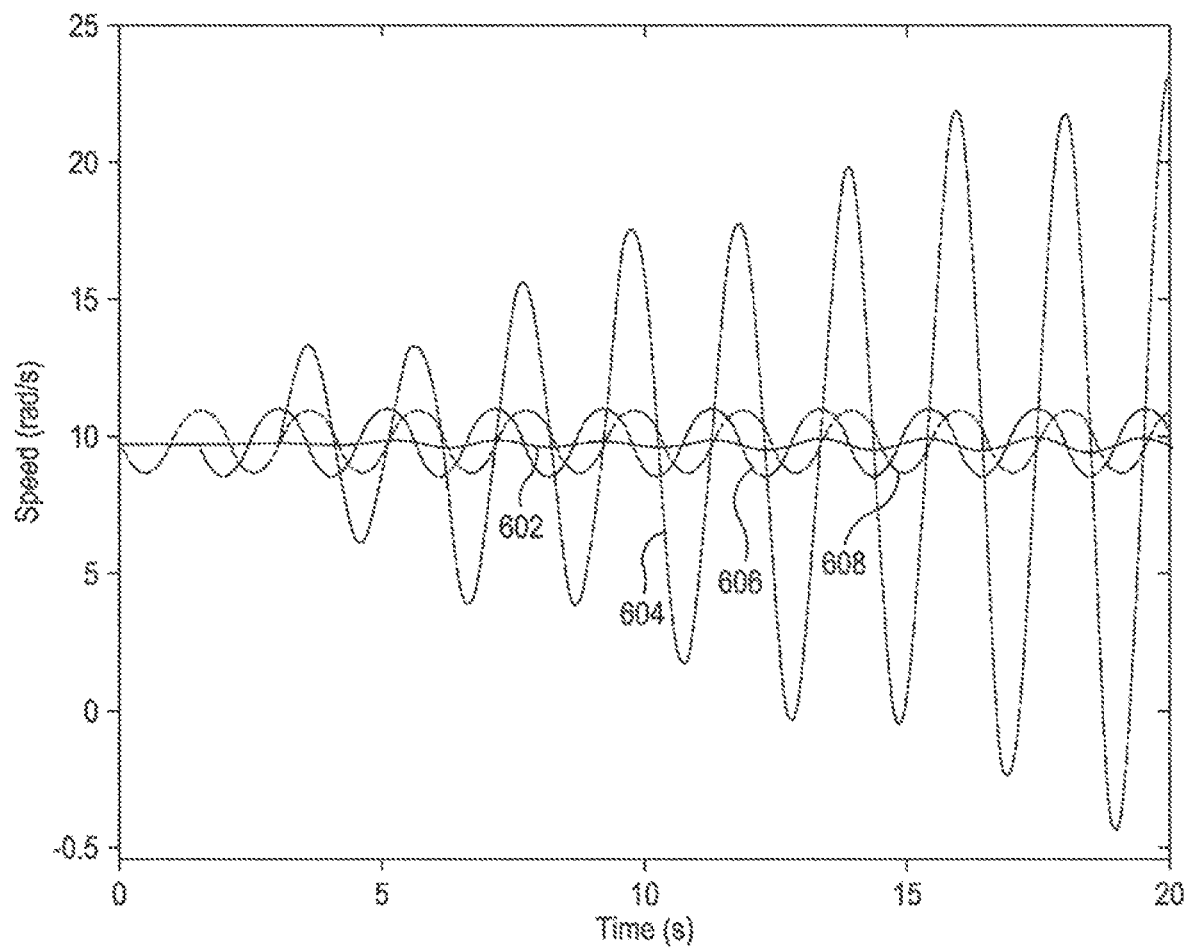
FIG. 6 illustrates a variation in the top drive rotational speed and drill bit rotational speed when using the control system of FIG. 4 and a conventional PI controller in response to a sinusoidal torque acting on the drill string in FIG. 1B.

FIG. 6 illustrates a variation in the top drive rotational speed and drill bit rotational speed when using the control system 118 of FIG. 4 and a conventional PI controller in response to a sinusoidal torque acting on the drill bit end of the drill string 104 (FIG. 1B). The proportional and integral gains are assumed to be same as those of the speed regulation controller 402 of the control system 118. The frequency of the sinusoidal torque on drill bit matches the second natural frequency of the drill string 104 having the end coupled to the top drive 102 (FIG. 1B) fixed and the opposite end coupled to the drill bit free. As illustrated, the drill string 104 and the top drive 102 begin rotating at a constant rotational speed of about 10 rad/s. When the conventional PI controller is used to generate the torque command to the top drive 102, the top drive speed is relatively constant, as indicated by curve 602. However, because the drill string 104 absorbs almost all energy from the torque input at the drill bit 108, while negligible energy is absorbed by the top drive 102, the drill string oscillations increase continuously and the rotational speed 604 of the drill string 104 at the drill bit end continues to increase. When the control system 118 is used, the top drive absorbs vibration of the drill string 104 without reflecting any vibration back into the drill string 104. Also, the top drive speed changes in response to the vibration in the drill string 104, and the torsional vibrations are damped out by the top drive 102. As a result, the rotational speed 606 of the top drive 102 and the rotational speed 608 of the drill bit 108 are bounded and the torsional vibration of the drill string 104 is substantially smaller as compared to the torsional vibrations generated when using a conventional PI controller.

Figure 7:
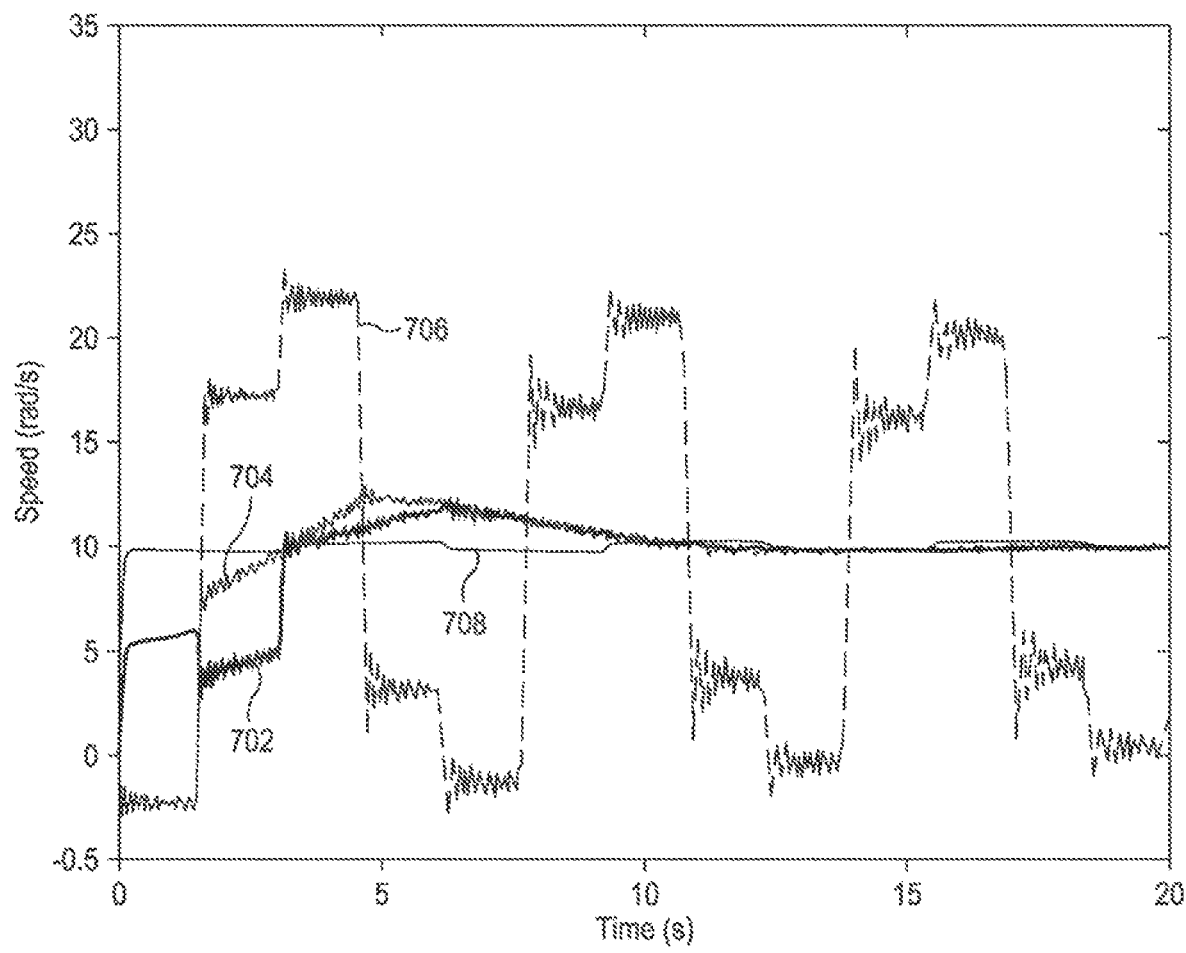
FIG. 7 illustrates a simulation result comparing the top drive and drill bit rotational speed responses obtained when using the control system of FIG. 4 and a conventional PI controller.

FIG. 7 illustrates a simulation result comparing the top drive and drill bit rotational speed responses obtained when using the control system 118 of FIG. 4 and a conventional PI controller. Herein, it is assumed that the drill bit 108 (FIG. 1B) is subject to a constant torque of about 1000 Nm. The drill string 104 (FIG. 1B) is stationary at the beginning (time=0) of the simulation. As illustrated, the rotational speed set point of the drill string 104 and top drive 102 (FIG. 1B) is about 10 rad/s. When the control system 118 is used, the rotational speed 702 of the top drive 102 and the rotational speed 704 of the drill bit 108 approach the set point in about 10 seconds, and the drill string 104 exhibits negligible torsional vibrations. As a comparison, when a conventional PI controller is used, the torsional vibrations are reflected by the top drive 102 and travel back-and-forth along the drill string, and the rotational speed 706 of the drill bit 108 exhibits substantially large variations, although the speed 708 of the top drive 102 is held relatively constant by the conventional PI controller.

Figure 8B:
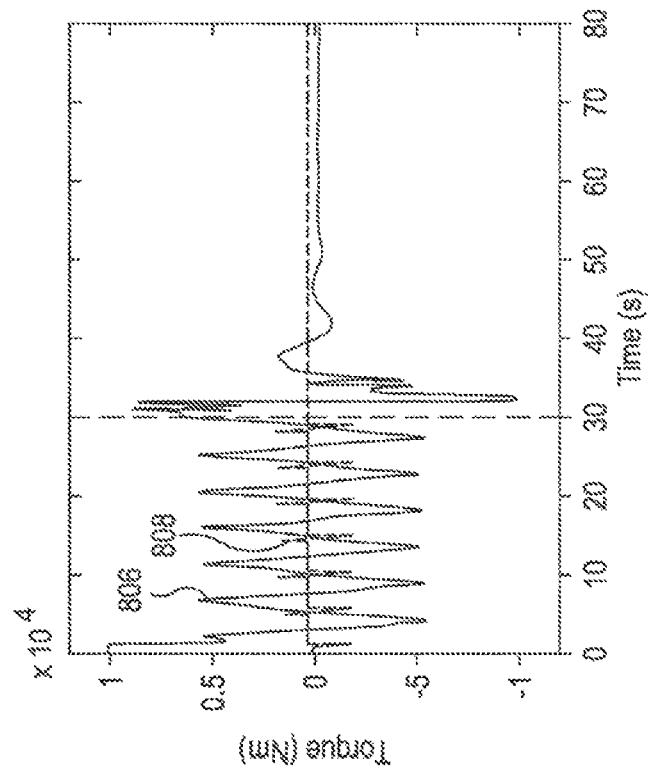
FIGS. 8A and 8B are plots that provide a comparison of the performances of the control system of FIG. 4 (FIG. 8A) and a conventional PI controller (FIG. 8B) in mitigating torsional vibrations.
Figure 8A:
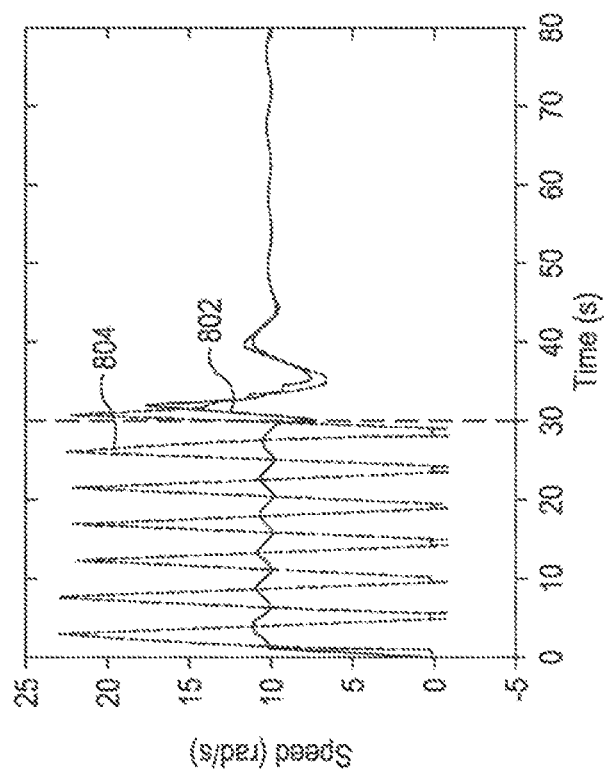

FIGS. 8A and 8B are plots that provide a comparison of the performances of the control system 118 of FIG. 4 (FIG. 8A) and a conventional PI controller (FIG. 8B) in mitigating torsional vibrations. With continued reference to FIG. 1B, FIG. 8A illustrates a variation in the speed 802 of the top drive 102 and the speed 804 of the drill bit 108 and FIG. 8B illustrates the variation in the torque 806 on the top drive 102 and the torque 808 on the drill bit 108. The simulation assumes a 3000 meter long drill string 104 and includes models of the bottom hole assembly 106 and drill bit 108. The damping effect due to friction between the drill bit 108 and the formation is also considered. In the first 30 seconds of simulation, the conventional PI controller is used to control the speed 802 of the top drive 102. From the large variation in the speed 804 of the drill bit 108 from the rotational speed set point of about 10 rad/s, it will be understood that the drill string 104 exhibits torsional vibrations in the first 30 seconds. After 30 seconds, the control system 118 is used for controlling the top drive 102, and the torsional vibrations disappear in about 30 seconds.

In FIG. 8B, it is seen that the torque 806 on the top drive 102 and the torque 808 on the drill bit 108 exhibit a similar behavior. Specifically, in the first 30 seconds of simulation, the conventional PI controller is used to control the torque 806 on the top drive 102. As seen, the conventional PI controller has to vary the torque 806 of the top drive 102 by a substantially large amount to counteract the torsional vibrations to maintain a substantially constant torque 808 on the drill bit 108. At about 30 seconds, the control system 118 is used to control the top drive 102 and the torsional vibrations substantially reduce and the variation in the torque 806 on the top drive 102 and the torque 808 on the drill bit 108 is negligible. It should be noted that the simulation assumes the control input is bounded between positive 10,000 Nm and negative 10,000 Nm. If higher control input limits are available (higher than 10,000 Nm), the torsional vibrations may be canceled out in a relatively shorter time.

FIGS. 9A, 9B, 10A, and 10B are plots that compare simulation results obtained by implementing the exemplary control method for mitigating torsional vibrations and a conventional control method for mitigating torsional vibrations. In the simulation, a PI controller implementing the conventional control method is tuned for maximum damping at the frequency of the disturbance force (e.g., the varying force due to the interaction between the drill bit 108 and the surrounding formation) at the drill bit end of the drill string. A small damping coefficient is used in the simulation to better present differences between the PI controller and the controller implementing the exemplary control method.

Figure 9A:
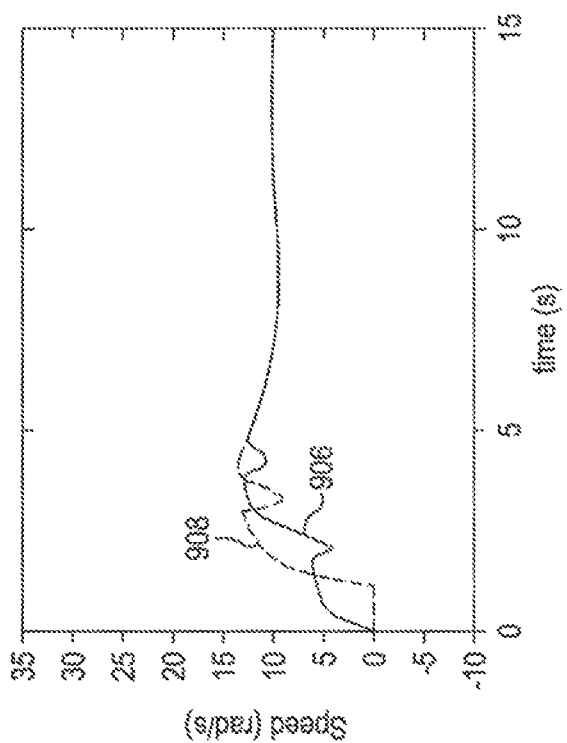
FIGS. 9A and 9B are plots that compare the top drive and drill bit speeds when implementing the exemplary control method for mitigating torsional vibrations and a conventional control method for mitigating torsional vibrations.
Figure 9B:
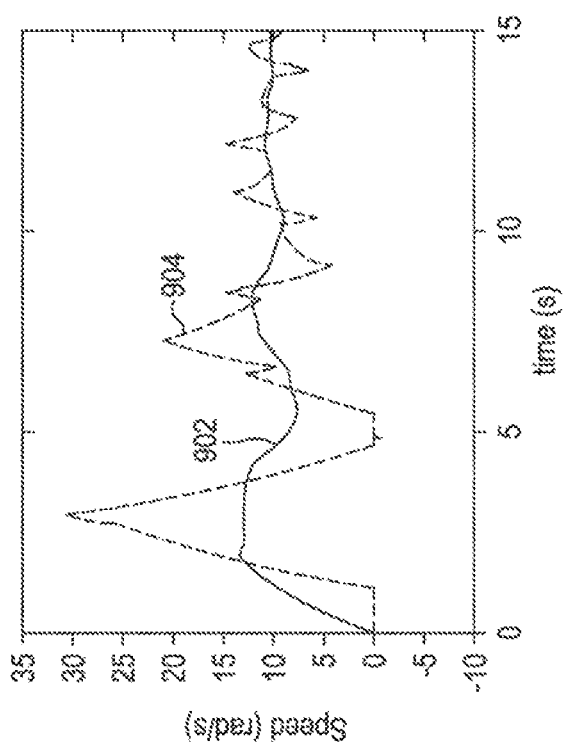
Figure 10B:
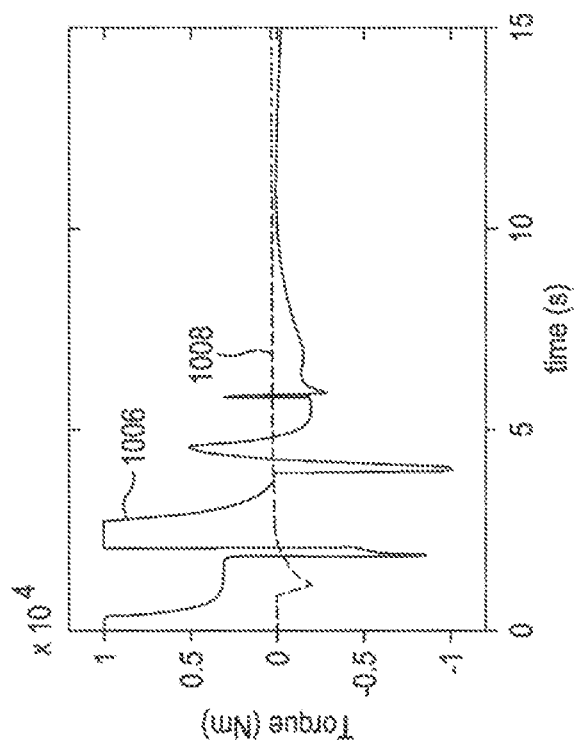
FIGS. 10A and 10B are plots that compare the torques acting on the drill bit and the top drive when implementing the exemplary control method for mitigating torsional vibrations and a conventional control method for mitigating torsional vibrations.
Figure 10A:
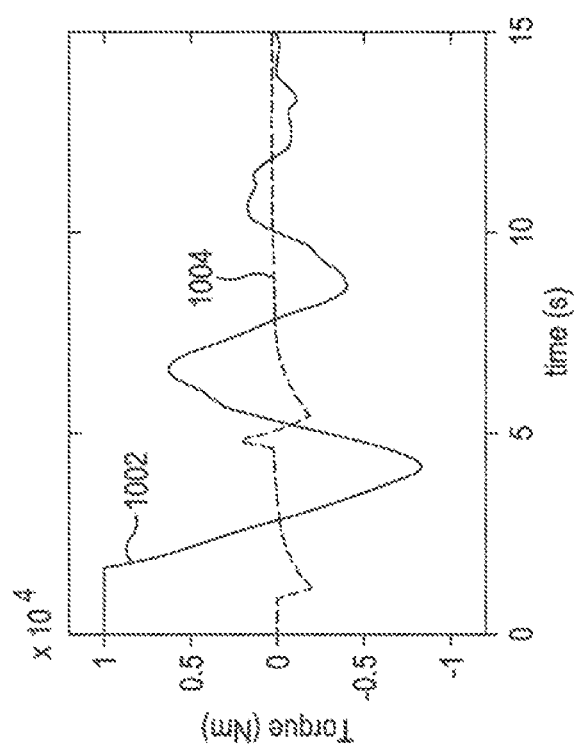

As illustrated in FIGS. 9A and 9B, for a relatively constant speed 902 of the top drive 102, the drill bit 108 speed 904 varies substantially due to the presence of torsional vibrations. This indicates that the PI controller is able to cancel out torsional vibration at a tuned stick-slip frequency. However, for the torsional vibration at higher frequencies, the PI controller has limited mitigation effect. In FIG. 10A, a similar behavior is observed in the top drive 102 torque 1002 and the drill bit 108 torque 1004. As a comparison to FIG. 9B, when using a controller that implements the exemplary control method, it is seen that the drill bit 108 speed 908 does not exhibit high frequency oscillations during a variation in the speed 906 of the top drive 102. In FIG. 10B, it can be seen that the controller is able to cancel out torsional vibrations 1006 in the top drive 102 and the torsional vibrations 1008 in the drill bit 108 over a relatively wide frequency range.

The torsional vibration mitigation method, according to one or more embodiments disclosed above, requires knowledge about system parameters including the top drive equivalent rotational inertia $J_T$, drill string section property (e.g., second moment of inertia It of a cross-section of drill string) at the connection to the top drive, and physical properties of the drill string such as the shear modulus G of the drill string material and the density p of the drill string material. However, it should be understood that the system parameters are not limited thereto, and one or more additional system parameters may be considered when implementing the torsional vibration mitigation method.

The system parameters can be calculated or measured prior to the drilling operation. Alternatively, these system parameters may be obtained by measuring the top drive speed and torque output from the top drive during drilling operations. These identified parameters are used to estimate the torque waves $V^{\leftarrow}$ and $V^{\rightarrow}$ more accurately. These estimated parameters are also provided to the vibration mitigation controller 404 of the control system 118 in FIG. 4 to absorb the torsional vibrations more effectively.

Figure 11:
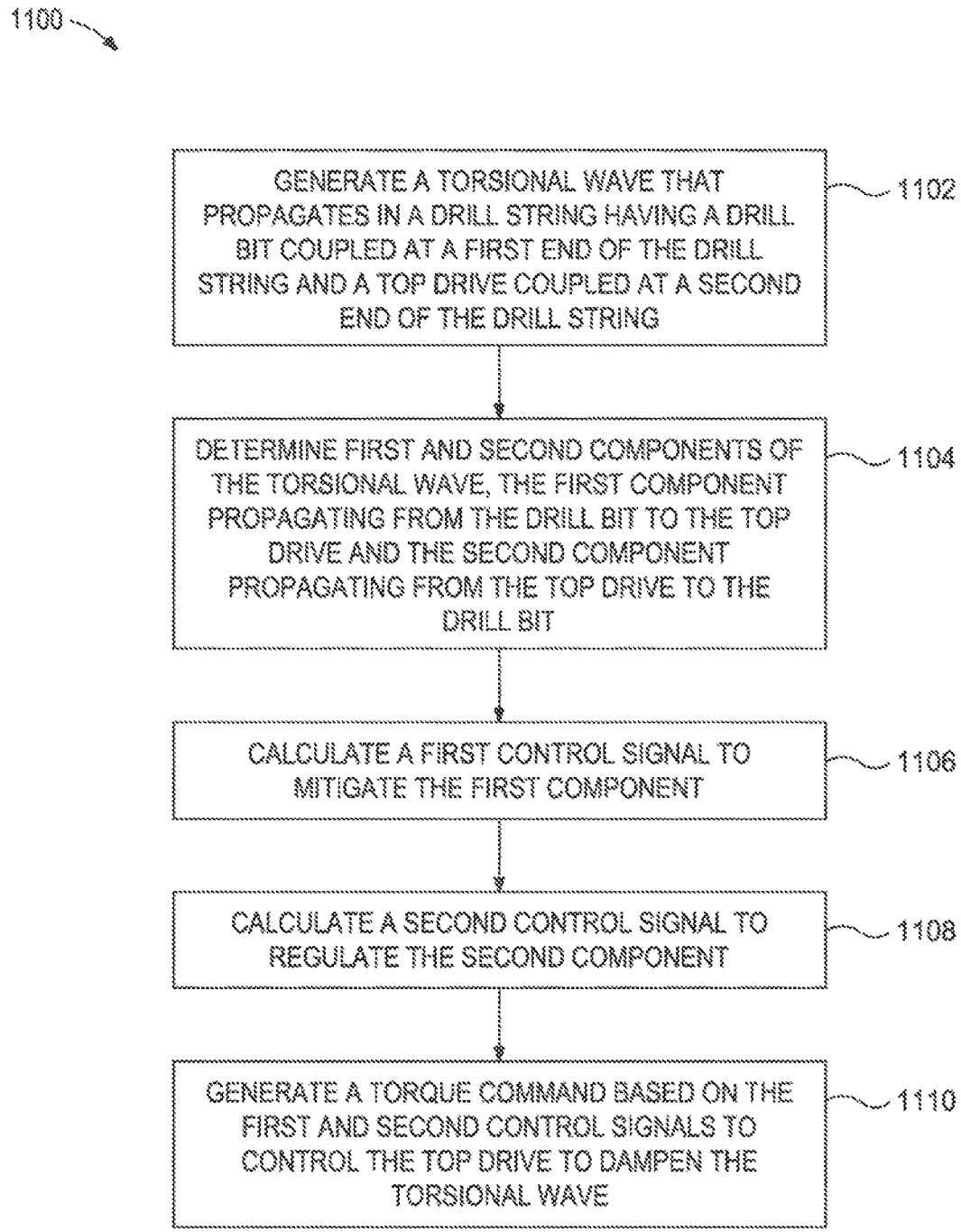
FIG. 11 is a flowchart of a method for mitigating torsional vibrations in a drill string.

FIG. 11 is a flowchart of a method 1100 for mitigating torsional vibrations in a drill string. The method 1100 includes generating a torsional wave that propagates in a drill string having a drill bit coupled at a first end of the drill string and a top drive coupled at a second end of the drill string, as at 1102, and determining first and second components of the torsional wave, as at 1104. The first component propagates from the drill bit to the top drive and the second component propagates from the top drive to the drill bit. The method 1100 further includes calculating a first control signal to mitigate the first component, as at 1106, calculating a second control signal to regulate the second component, as at 1108, and generating a torque command based on the first and second control signals to control the top drive to dampen the torsional wave, as at 1110.

Figure 12:
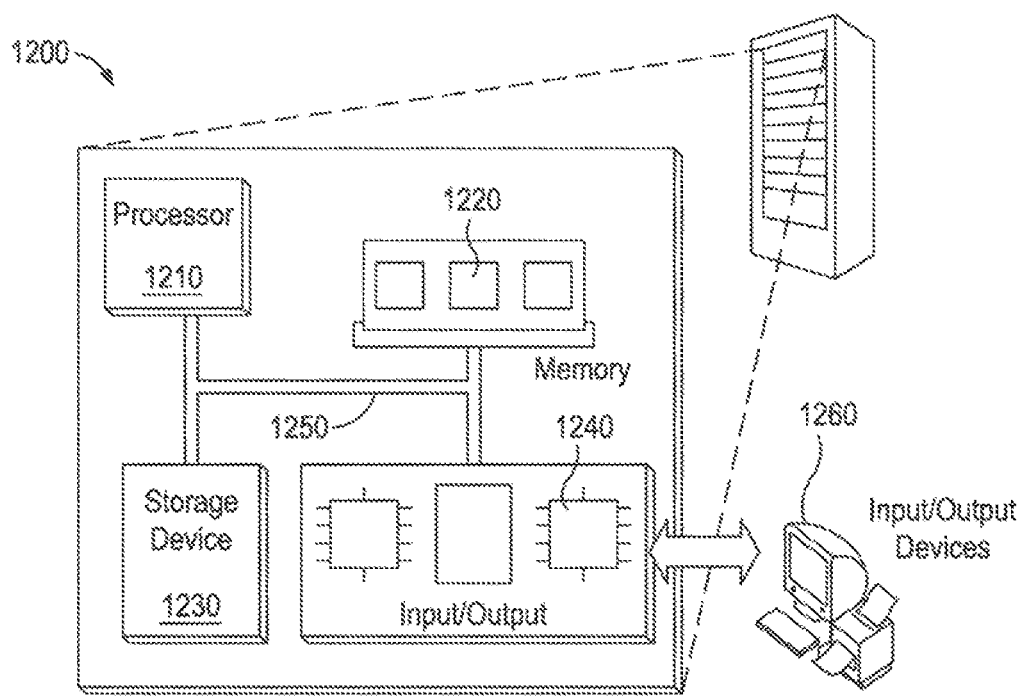
FIG. 12 illustrates an exemplary computer system for controlling the operation of the control system of FIG. 4 and for performing other tasks disclosed herein.

FIG. 12 illustrates an exemplary computer system 1200 for controlling the operation of the control system 118 (FIG. 4) for mitigating torsional vibrations in the drill string 104 (FIG. 4). Specifically, the computer system 1200 may be communicably coupled to the control system 118 or form an integral part thereof for controlling the operations of one or more of the speed regulation controller 402 (FIG. 4), the vibration mitigation controller 404 (FIG. 4), and the set point controller 406 (FIG. 4) to generate the torque command 408 (FIG. 4) to control the top drive 102 (FIG. 4).

The computer system 1200 may include a processor 1210, computer-readable storage mediums such as memory 1220 and a storage device 1230, and an input/output device 1240. Each of the components 1210, 1220, 1230, and 1240 may be interconnected, for example, using a system bus 1250. The processor 1210 may be processing instructions for execution within the computer system 1200. In some embodiments, the processor 1210 is a single-threaded processor, a multi-threaded processor, a system on a chip, a special purpose logic circuitry, e.g., an FPGA (field programmable gate array) or an ASIC (application specific integrated circuit), or another type of processor. The processor 1210 may be capable of processing computer program code stored in the memory 1220 or on the storage device 1230. The memory 1220 and the storage device 1230 include non-transitory mediums such as random access memory (RAM) devices, read only memory (ROM) devices, optical devices (e.g., CDs or DVDs), semiconductor memory devices (e.g., EPROM, EEPROM, flash memory devices, and others), magnetic disks (e.g., internal hard disks, removable disks, and others), and magneto optical disks.

The input/output device 1240 may provide input/output operations for the computer system 1200. In some embodiments, the input/output device 1240 can include one or more network interface devices, e.g., an Ethernet card; a serial communication device, e.g., an RS-232 port; and/or a wireless interface device, e.g., an 802.11 card, a 3G wireless modem, or a 4G wireless modem. In some embodiments, the input/output device 1240 can include driver devices configured to receive input data and send output data to other input/output devices 1260 including, for example, a keyboard, a pointing device (e.g., a mouse, a trackball, a tablet, a touch sensitive screen, or another type of pointing device), a printer, and display devices (e.g., a monitor, or another type of display device) for displaying information to a user. Other kinds of devices can be used to provide for interaction with the user as well; for example, feedback provided to the user can be any form of sensory feedback, e.g., visual feedback, auditory feedback, or tactile feedback; and input from the user can be received in any form, including acoustic, speech, or tactile input. In some embodiments, mobile computing devices, mobile communication devices, and other devices can be used.

The computer system 1200 may include a single processing system, or may be a part of multiple processing systems that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective processing systems and having a client-server relationship to each other.

Embodiments disclosed herein include:

A. A method that includes generating a torsional wave that propagates in a drill string having a drill bit coupled at a first end of the drill string and a top drive coupled at a second end of the drill string, determining first and second components of the torsional wave, the first component propagating from the drill bit to the top drive and the second component propagating from the top drive to the drill bit, calculating a first control signal to mitigate the first component, calculating a second control signal to regulate the second component, and generating a torque command based on the first and second control signals to control the top drive to dampen the torsional wave.

B. A system that includes a drill string that includes a drill bit coupled to a first end thereof and a top drive coupled to a second opposite end thereof, a first controller to calculate a first control signal, a second controller to calculate a second control signal, a computer system including a processor and a non-transitory computer readable medium, the computer system being communicatively coupled to the first and second controllers and the computer readable medium storing a computer readable program code that when executed by the processor causes the computer system to: determine a first component and a second component of a torsional wave propagating in the drill string, the first component propagating from the drill bit to the top drive and the second component propagating from the top drive to the drill bit, actuate the first controller to calculate the first control signal to mitigate the first component, actuate the second controller to calculate the second control signal to regulate the second component, and generate a torque command based on the first and second control signals to control the top drive to dampen the torsional wave.

C. A computer program product tangibly embodied in a computer-readable storage device and comprising a computer readable program code that, when executed by a computer system, causes the computer system to: determine a first component and a second component of a torsional wave propagating in a drill string that includes a drill bit coupled to a first end thereof and a top drive coupled to a second opposite end thereof, the first component propagating from the drill bit to the top drive and the second component propagating from the top drive to the drill bit, actuate a first controller to calculate a first control signal to mitigate the first component, actuate a second controller to calculate a second control signal to regulate the second component, and generate a control signal based on the first and second control signals to control the top drive to dampen the torsional wave.

Each of embodiments A, B, and C may have one or more of the following additional elements in any combination:

Element 1: further comprising generating the torsional wave during a drilling operation, measuring a rotational speed of the top drive and a torque output from the top drive during the drilling operation, determining a torque to be exerted on the drill bit based on the measured rotational speed and torque output, and updating the first and second control signals based on the determined torque. Element 2: further comprising providing set points to calculate the first and second control signals and based on a desired rotational speed of the drill string, and updating the first and second control signals to maintain the desired rotational speed. Element 3: wherein the first control signal determines a torque exerted on the drill string by the top drive and the method further comprises generating the first control signal based on one or more physical properties of the drill string. Element 4: further comprising generating the torque command based on a summation of the first and second control signals. Element 5: further comprising generating the torsional wave during a drilling operation, measuring a rotational speed of the top drive and a torque output from the top drive during the drilling operation, determining a physical property of at least one of the drill string and the top drive based on the measured rotational speed and torque output, and generating at least one of the first and second control signals based on the determined physical property.

Element 6: wherein executing the program code further causes the computer system to measure a rotational speed of the top drive and a torque output from the top drive during a drilling operation that generates the torsional wave, determine a torque to be exerted on the drill bit based on the measured rotational speed and torque output, and update the first and second control signals based on the determined torque. Element 7: wherein the system further comprises a set point controller that provides set points to the first and second controllers and executing the program code further causes the computer system to actuate the set point controller to provide the set points to the first and second controllers based on a desired rotational speed of the drill string, and actuate the first and second controllers to update the first and second control signals to maintain the desired rotational speed. Element 8: wherein the first control signal controls a torque exerted on the drill string by the top drive and executing the program code further causes the computer system to actuate the first controller to generate the first control signal based on one or more physical properties of the drill string. Element 9: wherein executing the program code further causes the computer system to generate the torque command based on a summation of the first and second control signals. Element 10: wherein executing the program code further causes the computer system to measure a rotational speed of the top drive and a torque output from the top drive during a drilling operation that generates the torsional wave, determine a physical property of at least one of the drill string and the top drive based on the measured rotational speed and torque output, and actuate the first and second controllers to generate at least one of the first and second control signals based on the determined physical property.

Element 11: wherein executing the program code further causes the computer system to measure a rotational speed of the top drive and a torque output from the top drive during a drilling operation that generates the torsional wave, determine a torque to be exerted on the drill bit based on the measured rotational speed and torque output, and update the first and second control signals based on the determined torque. Element 12: wherein executing the program code further causes the computer system to actuate a set point controller to provide set points to the first and second controllers based on a desired rotational speed of the drill string, and actuate the first and second controllers to update the first and second control signals to maintain the desired rotational speed. Element 13: wherein the first control signal determines a torque exerted on the drill string by the top drive and wherein executing the program code further causes the computer system to actuate the first controller to generate the first control signal based on one or more physical properties of the drill string. Element 14: wherein executing the program code further causes the computer system to generate the control signal based on a summation of the first and second control signals. Element 15: wherein executing the program code further causes the computer system to: measure a rotational speed of the top drive and a torque output from the top drive during a drilling operation, determine a physical property of at least one of the drill string and the top drive based on the measured rotational speed and torque output, and actuate the first and second controllers to generate at least one of the first and second control signals based on the determined physical property.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

What is claimed is:

1. A method, comprising:
    determining first and second torsional wave components of a torsional wave propagating in a drill string, the first torsional wave component propagating from the drill bit of the drill string to a top drive of the drill string and the second torsional wave component propagating from the top drive to the drill bit;
    calculating a speed control parameter to rotate the drill string at a speed set point that mitigates the first torsional wave component, wherein the speed set point is based on a torque on the drill bit, and the speed set point comprises a summation of a speed set point for the first torsional wave component and a speed set point for the second torsional wave component;
    calculating a vibration control parameter to rotate the top drive to absorb the second torsional wave component at or near a junction of the drill string, wherein calculating the vibration control parameter comprises calculating a torque of the top drive that prevents reflection of torsional waves at the junction; and
    generating a torque command based on the speed control parameter and the vibration control parameter to control the top drive to dampen the torsional wave.

2. The method of claim 1, further comprising:
    measuring a rotational speed of the top drive and a torque output from the top drive during a drilling operation corresponding to the torsional wave;
    determining a torque to be exerted on the drill bit based on the measured rotational speed and torque output; and
    updating the speed control parameter and the vibration control parameter based on the determined torque.

3. The method of claim 1, further comprising:
providing set points to calculate the speed control parameter and the vibration control parameter based on a desired rotational speed of the drill string; and
updating the speed control parameter and the vibration control parameter to maintain the desired rotational speed.

4. The method of claim 1, wherein the torque command controls a torque exerted on the drill string by the top drive and the method further comprises generating the torque command based on one or more physical properties of the drill string.

5. The method of claim 1, further comprising generating the torque command based on a summation of the speed control parameter and the vibration control parameter.

6. The method of claim 1, further comprising:
measuring a rotational speed of the top drive and a torque output from the top drive during the drilling operation;
determining a physical property of at least one of the drill string and the top drive based on the measured rotational speed and torque output; and
generating at least one of the speed control parameter and the vibration control parameter based on the determined physical property.

7. The method of claim 1, further comprising calculating the speed set point.

8. The method of claim 7, wherein the speed set points for the first and second torsional wave components are based on properties of the drill string, the torque on the drill bit, and a direction of propagation of the first and second torsional wave components.

9. A system, comprising:
a drill string that includes a drill bit coupled to a first end thereof and a top drive coupled to a second opposite end thereof;
a first controller to calculate a speed control parameter;
a second controller to calculate a vibration control parameter;
a computer system including a processor and a non-transitory computer readable medium, the computer system being communicatively coupled to the first and second controllers and the computer readable medium storing a computer readable program code that when executed by the processor causes the computer system to:
determine a first component and a second component of a torsional wave propagating in the drill string, the first component propagating from the drill bit to the top drive and the second component propagating from the top drive to the drill bit;
actuate the first controller to calculate the speed control parameter to rotate the drill string at a speed set point that mitigates the first component, wherein the speed set point is based on a torque on the drill bit, and the speed set point comprises a summation of a speed set point for the first torsional wave component and a speed set point for the second torsional wave component;
actuate the second controller to calculate the vibration control parameter to rotate the top drive to absorb the second component at or near a junction of the drill string, wherein calculating the vibration control parameter comprises calculating a torque of the top drive that prevents reflection of torsional waves at the junction; and
generate a torque command based on the speed control parameter and the vibration control parameter to control the top drive to dampen the torsional wave.

10. The system of claim 9, wherein executing the program code further causes the computer system to:
measure a rotational speed of the top drive and a torque output from the top drive during a drilling operation that generates the torsional wave;
determine a torque to be exerted on the drill bit based on the measured rotational speed and torque output; and
update the speed control parameter and the vibration control parameter based on the determined torque.

11. The system of claim 9, wherein the system further comprises a set point controller that provides set points to the first and second controllers and executing the program code further causes the computer system to:
actuate the set point controller to provide the set points to the first and second controllers based on a desired rotational speed of the drill string; and
actuate the first and second controllers to update the speed control parameter and the vibration control parameter to maintain the desired rotational speed.

12. The system of claim 9, wherein the torque command controls a torque exerted on the drill string by the top drive and executing the program code further causes the computer system to actuate the first controller to generate the speed control parameter based on one or more physical properties of the drill string.

13. The system of claim 9, wherein executing the program code further causes the computer system to generate the torque command based on a summation of the speed control parameter and the vibration control parameter.

14. The system of claim 9, wherein executing the program code further causes the computer system to:
measure a rotational speed of the top drive and a torque output from the top drive during a drilling operation that generates the torsional wave;
determine a physical property of at least one of the drill string and the top drive based on the measured rotational speed and torque output; and
actuate the first and second controllers to generate at least one of the speed control parameter and the vibration control parameter based on the determined physical property.

15. A computer program product tangibly embodied in a computer-readable storage device and comprising a computer readable program code that, when executed by a computer system, causes the computer system to:
determine a first component and a second component of a torsional wave propagating in a drill string that includes a drill bit coupled to a first end thereof and a top drive coupled to a second opposite end thereof, the first component propagating from the drill bit to the top drive and the second component propagating from the top drive to the drill bit;
actuate a first controller to calculate a speed control parameter to rotate the drill string at a speed set point that mitigates the first component, wherein the speed set point is based on a torque on the drill bit, and the speed set point comprises a summation of a speed set point for the first torsional wave component and a speed set point for the second torsional wave component;
actuate a second controller to calculate a vibration control parameter to rotate the top drive to absorb the second component at or near a junction of the drill string, wherein calculating the vibration control parameter comprises calculating a torque of the top drive that prevents reflection of torsional waves at the junction; and generate a torque command based on the speed control parameter and the vibration control parameter to control the top drive to dampen the torsional wave.

16. The computer program product of claim 15, wherein executing the program code further causes the computer system to:

measure a rotational speed of the top drive and a torque output from the top drive during a drilling operation that generates the torsional wave;

determine a torque to be exerted on the drill bit based on the measured rotational speed and torque output; and update the speed control parameter and the vibration control parameter based on the determined torque.

17. The computer program product of claim 15, wherein executing the program code further causes the computer system to:

actuate a set point controller to provide set points to the first and second controllers based on a desired rotational speed of the drill string; and actuate the first and second controllers to update the speed control parameter and the vibration control parameter to maintain the desired rotational speed.

18. The computer program product of claim 15, wherein the torque command controls a torque exerted on the drill string by the top drive and wherein executing the program code further causes the computer system to actuate the first controller to generate the speed control parameter based on one or more physical properties of the drill string.

19. The computer program product of claim 15, wherein executing the program code further causes the computer system to generate the torque command based on a summation of the speed control parameter and the vibration control parameter.

20. The computer program product of claim 15, wherein executing the program code further causes the computer system to:

measure a rotational speed of the top drive and a torque output from the top drive during a drilling operation;

determine a physical property of at least one of the drill string and the top drive based on the measured rotational speed and torque output; and actuate the first and second controllers to generate at least one of the speed control parameters and the vibration control parameter based on the determined physical property.

* * * * *